US012675370B1

(12) United States Patent
Solanke et al.

(10) Patent No.: US 12,675,370 B1
(45) Date of Patent: Jul. 7, 2026

(54) ENHANCING BULK EXPORT OF BACKUP DATA

(71) Applicant: Druva Inc., Sunnyvale, CA (US)

(72) Inventors: Amar Solanke, Pune (IN); Somesh Jain, Pune (IN)

(73) Assignee: Druva Inc., Sunnyvale, CA (US)

( * ) Notice: Subject to any disclaimer, the term of this patent is extended or adjusted under 35 U.S.C. 154(b) by 118 days.

(21) Appl. No.: 17/646,272

(22) Filed: Dec. 28, 2021

(51) Int. Cl.
| | |
|---|---|
| *G06F 11/14* | (2026.01) |
| *G06F 11/1446* | (2026.01) |
| *G06F 16/23* | (2019.01) |

(52) U.S. Cl.
CPC ...... *G06F 11/1469* (2013.01); *G06F 11/1453* (2013.01); *G06F 11/1464* (2013.01); *G06F 16/2386* (2019.01)

(58) Field of Classification Search
CPC ............. G06F 11/1469; G06F 11/1453; G06F 11/1464; G06F 16/2386
USPC .................................................. 711/162, 161
See application file for complete search history.

(56) References Cited

U.S. PATENT DOCUMENTS

| | | | | |
|---|---|---|---|---|
| 6,389,433 B1 * | 5/2002 | Bolosky | .............. | G06F 11/1453 707/999.001 |
| 7,694,103 B1 * | 4/2010 | Kushwah | ............ | G06F 11/1448 711/6 |
| 2003/0009518 A1 * | 1/2003 | Harrow | ............... | H04L 67/1063 709/203 |
| 2010/0121825 A1 * | 5/2010 | Bates | .................. | G06F 16/1748 707/E17.044 |
| 2012/0084268 A1 * | 4/2012 | Vijayan | ................. | G06F 3/0652 707/E17.005 |
| 2021/0019285 A1 * | 1/2021 | Athlur | ................. | G06F 16/1748 |

OTHER PUBLICATIONS

"Spend less on file attachment storage space Reliably back up your data or file attachments Use your OpenAir data in your reporting tools" Storage Management Quick Reference, Copyright © 2013, 2021, Oracle and/or its affiliates, 7 pages.
"User Guide for VMware" Nakivo Backup & Replication v10.2, VMware Server User's Guide, Revision: Aug. 19, 2008, Item: EN-000057-00 700 pages.
Lourie Goodall et al., Cloud Storage Tier Export, Recovery and Testing, IBM® TS7700 Virtualization Engine, Document Version 1.0, Sep. 28, 2020, 64 pages.

* cited by examiner

*Primary Examiner* — Hosain T Alam
*Assistant Examiner* — Zubair Ahmed
(74) *Attorney, Agent, or Firm* — Kwan & Olynick LLP

(57) ABSTRACT

Provided are mechanisms and processes for a improving the processing and network efficiency of cloud backup bulk data export operations. Data being restored from cloud backups and archives to multiple devices can be intelligently analyzed in order to reduce consumption of network and processing resources on wide area networks and at cloud backup service providers. Data analysis may involve generating blockmaps, analyzing metadata, and determining other data attributes in order to reduce redundancy, determine tasks that can be handled locally, and benefit from other data characteristics.

20 Claims, 9 Drawing Sheets

100

Storage Saving On Target Machine
For Deduplicated Files 700

Store A Single Copy Of A First Target File
For A First User (or Device) (U1) 702

For Each Deduplicated File Matching
The First Target File,
Provide A Link To The First Target File 704

Restore The First Target File At U1 To
Restore Access To The Deduplicated File
Through Links For Multiple Users 706

END

ENHANCING BULK EXPORT OF BACKUP DATA

BACKGROUND

It is generally desirable to maintain backup data for computers and/or other devices in the event that the computers and/or other devices must be restored or migrated. In conventional settings, data may be stored on local on-premises disks, tape drives, and disk arrays. However, protecting data on-premises can be resource intensive, unreliable, and difficult to manage especially with the amount of data growing exponentially. Many entities have turned to cloud backup solutions to provide for more effective and efficient data protection. Cloud backup solutions have better data protection than on-site backup mechanisms because cloud backup solutions typically have more sophisticated redundancy and recovery mechanisms. Cloud backup solutions may also reduce complexity for information technology (IT) departments or for business and entities without significant IT resources. Well managed cloud backup solutions may also more effectively manage data regulatory requirements, have increased security, and provide relatively uninterrupted access to support 24/7.

However, some significant drawbacks of cloud backup solutions include longer network transmission times, network transmission latency, cloud backup provider processor and network usage costs, etc. One of the most significant drawbacks involves network transmission costs, which can be substantial in the event a bulk restore of data numerous devices is required. Consequently, various embodiments of the present invention provide techniques and mechanisms for improving the efficiency of cloud backup bulk export operations to restore or migrate computers and/or other devices.

OVERVIEW

Provided are various mechanisms and processes relating to improving the processing and network efficiency of cloud backup bulk data export operations. Data being restored from cloud backups and archives to multiple devices can be intelligently analyzed in order to reduce consumption of network and processing resources on wide area networks and at cloud backup service providers. Data analysis may involve generating blockmaps, analyzing metadata, and determining other data attributes in order to reduce redundancy, determine tasks that can be handled locally, and benefit from other data characteristics.

In one aspect, which may include at least a portion of the subject matter of any of the preceding and/or following examples and aspects, a process is provided. A request to bulk export data to a plurality of users including a first user and a second user is received at a server. The bulk export data includes multiple files to be restored onto a first user device associated with the first user and a second user device associated with the second user. The server is connected to the first and second user devices over a wide area network and the first and second user devices are connected to each other over a local area network. A first set of files to be restored for a first user is traversed.

The first set of files is restored to the first user by transmitting the first set of files over the wide area network. Common elements of the first set of files and a second set of files to be restored for a second user are determined. The common elements of the first set of files to the second user are restored by transmitting the elements over a local area network from the first user device to the second user device. A second set of files is restored to a second user by transmitting the second set of files minus the common elements over a wide area network to the second user.

These and other embodiments are described further below with reference to the figures.

DETAILED DESCRIPTION OF EXAMPLE EMBODIMENTS

Figure 1:
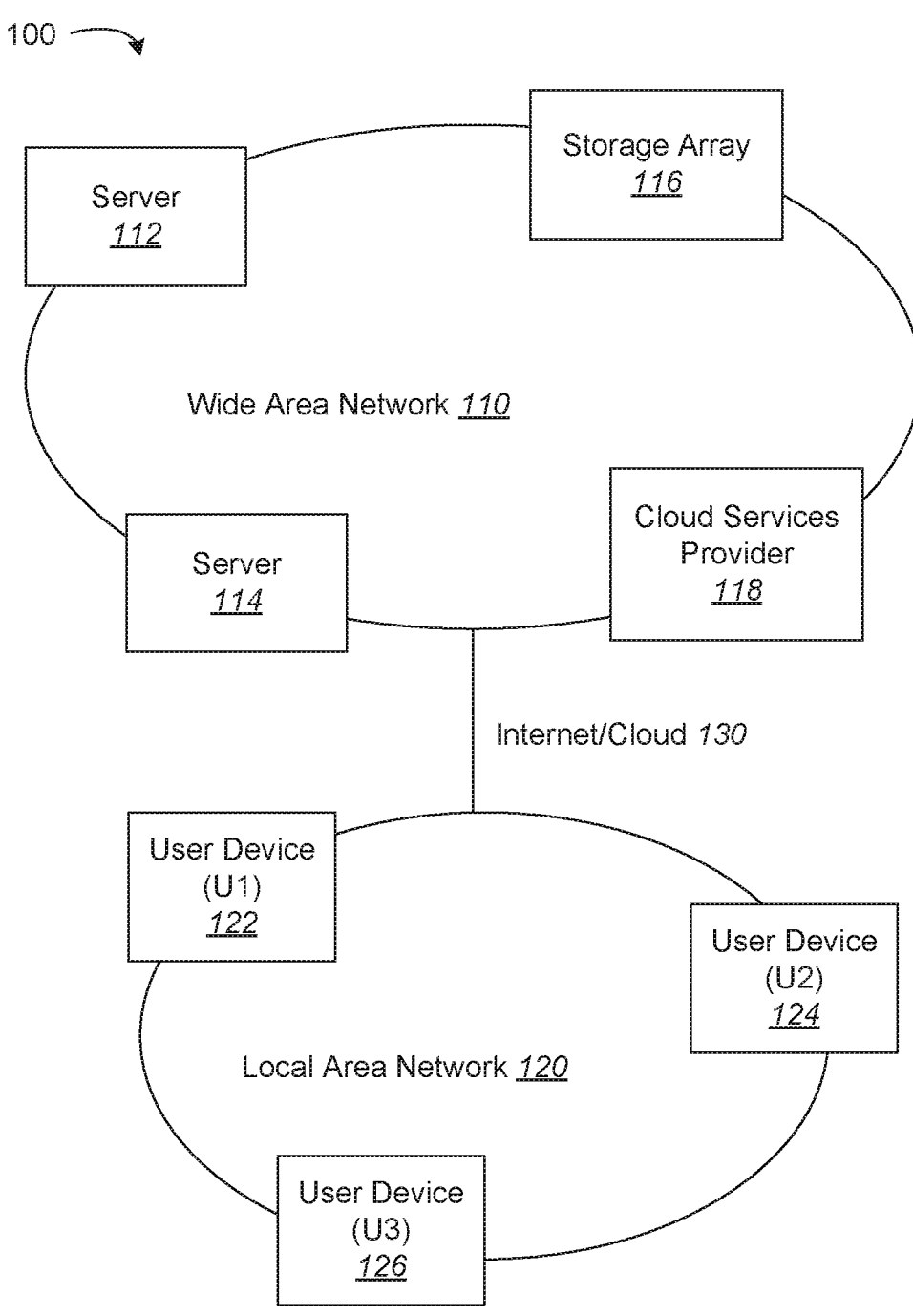
FIG. 1 is a diagrammatic representation of a network that can be used in various embodiments of the present invention.

Reference will now be made in detail to some specific examples of the invention including the best modes contemplated by the inventors for carrying out the invention. Examples of these specific embodiments are illustrated in the accompanying drawings. While the present disclosure is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In addition, although many of the components and processes are described below in the singular for convenience, it will be appreciated by one of skill in the art that multiple components and repeated processes can also be used to practice the techniques of the present disclosure.

In the following description, numerous specific details are set forth in order to provide a thorough understanding of the present invention. Particular embodiments of the present invention may be implemented without some or all of these specific details. In other instances, well known process operations have not been described in detail in order not to unnecessarily obscure the present invention.

It is generally desirable to backup data for computers and/or other devices in the event that the data stored on the computers and/or other devices must be restored or migrated. In conventional settings, data may be archived onto local on-premises disks, tape drives, and disk arrays. However, protecting data on-premises can be resource intensive, unreliable, and difficult to manage especially with the amount of business and other data growing exponentially. Many entities have turned to cloud backup solutions to provide for more effective and efficient data protection. Cloud backup solutions have better data protection than on-site backup mechanisms because cloud backup solutions typically have more sophisticated redundancy and recovery mechanisms. Cloud backup solutions may also reduce complexity for information technology (IT) departments or for business and entities without significant IT resources. Well managed cloud backup solutions may also more effectively manage data regulatory requirements, have increased security, and provide relatively uninterrupted access to support 24/7.

However, some significant drawbacks of cloud backup solutions remain include longer network transmission times, network transmission latency, cloud backup provider processor and network usage costs, etc. One of the most significant drawbacks involves network transmission costs, which can be substantial in the event a bulk restore of data numerous devices is required.

There are many instances when data must be bulk restored, such in the case of a ransomware attack that erases or damages files for multiple users. In this instance, an administrator typically needs to export or restore all of the affected device data (e.g. file servers, databases, virtual machines, endpoints), User's apps (e.g. Exchange online, OneDrive, Gmail, Gdrive, etc.), and Organization apps (e.g. SharepointOnline, Teams, Public Folder or Shared Drives, etc.) manually and potentially at all the restore points. Similarly, if the data needs to be migrated for any other reason, such as the implementation of new devices for multiple users, such as at an office with multiple employees who are receiving updated computers, the data from the old devices such as the device data, User's apps, and Organization apps is typically exported or restored at all of the restore points.

In existing systems, backing up and restoring data for devices across a system is typically time-consuming and expensive. If the system includes multiple users, servers, and/or devices, the backup data for each of these entities is often stored as the latest snapshot of the data for the entity on a server that is located in a wide area network, across the internet, and/or on the cloud, etc. If an administrator wants to download or restore all of the data for multiple users, servers, and/or devices, all of these snapshots must be downloaded or migrated from the stored backup data across a wide area network and/or internet connection. This type of system-wide restoration is a significant request that generally consumes a lot of network and processing resources across a wide area network and at a cloud backup service provider.

Currently, when such a large data export case is initiated, the data for the users and/or devices is often restored multiple times. In some instances, the same file is shared across multiple users and/or devices within an application such as OneDrive, Gdrive, SharepointOnline, a shared drive, etc. These files can be present across multiple users in multiple instances as well. Additionally, some of the same files may exist as different versions with small variations between them, but restored or downloaded separately for each of the users and/or devices. Because all of the files for each user and/or device is typically downloaded from backup data snapshots during a restoration or migration, a large amount of data must be transmitted when restoring or migrating data for multiple users. This download process can be expensive and time consuming because each file for each user and/or device must be downloaded individually across a wide area network and/or internet connection, etc.

Accordingly, various embodiments of the present invention relate to improved methods and systems for restoring and/or downloading data to users and/or user devices by providing a more efficient process for the bulk export of backup data. These methods and systems are more cost effective and less time-consuming than previous solutions. In particular, the examples described in this disclosure present particular methods and systems for transmitting backup data to multiple users in ways that reduce the amount of time and expense needed to restore or migrate the data to all of these multiple user devices. Especially when a large number of user devices must be migrated or restored, this savings of time can be significant. Additionally, if the cost associated with the migration or restoration includes both the cost of downtime (i.e. the amount of time lost in productivity to the user devices during migration of all of the user devices in a system) and the cost of transmitting the large amounts of data to each of the user devices over a network and/or internet connection, it is desirable to reduce the amount of downtime and the amount of data transmitted over costly networks and/or internet connections during a restoration or migration.

With reference to FIG. 1, shown is a diagrammatic representation of a network that can be used with various embodiments of the present invention. As shown, network 100 includes a wide area network 110 and a local area network 120. In the present example, wide area network 110 includes server 112, server 114, storage array 116, and cloud services provider 118. According to various examples, one or more of these entities 112, 114, 116, and/or 118 in wide area network 110 may store backup data for user devices located in local area network 120.

According to various embodiments, the wide area network 110 is connected to the local area network 120 through an internet connection 130. In the present example, local area network 120 includes user device (U1) 122, user device (U2) 124, and user device (U3) 126. In one example, user devices 122, 124, and 126 may be issued to employees at a company and the local area network 120 may include various other devices, including additional user devices, which are not shown. In another example, user devices 122, 124, and 126 may be devices at a university library and the local area network 120 may include various other devices, including additional user devices, which are not shown. Similarly, user devices 122, 124, and 126 can represent devices that are connected to each other through any local area network 120.

According to various embodiments, backup data is stored for user devices 122, 124, and 126. In some examples, backup data for these various devices may be stored at a device within the local area network 120. However, it may also be desirable to store backup data at a location outside of the local area network 120 in case all of the devices in the local area network need to be restored or migrated in response to a ransomware attack of all of the devices or a hardware update of all of the devices in the local area network 120. In a particular example, all of the data associated with each user devices 122, 124, and 126 can be saved as backup data at one or more locations in the wide area network 110 that is accessible to the user devices 122, 124, and 126 through an internet/cloud connection 130. For instance, an outside company may provide cloud storage at server 112 where users and/or devices in local area network 120 can save their back up files. In this example, the backup data can be saved periodically and/or automatically, such that each file for a user device is copied or otherwise saved to server 112 at designated times. In some implementations, these saved files are then replaced with new copies of the files when the next periodic or automatic backup is performed. Accordingly, the backup files stored at server 112 provide a full snapshot of the files needed to restore user devices 122, 124, and 126 at a given time.

In the present example, if all of the data associated with user devices 122, 124, and 126 must be restored according to methods previously used in the industry, then the backup files stored at server 112 for each user device 122, 124, and 126 must be transmitted over an internet/cloud connection 130 to each of the respective user devices 122, 124, and 126. In particular, a copy of each file stored as backup data for user device 122 is transmitted over internet/cloud connection 130 to user device 122. Similarly, a copy of each file stored as backup data for user device 124 is also transmitted from server 112 over internet/cloud connection 130 to user device 124. This process is repeated for user device 126 and for any other user devices that may need to be restored in local area network 120.

In the present example, downloading the large number of files needed to restore a user device may be very expensive because a service provider may charge fees based on the amount of data transmitted over the internet/cloud. Accordingly, as the number of files to be downloaded from the wide area network 110 over internet/cloud 130 increases, the fees for transmitting these files also increases. Furthermore, because downloading the files takes time, as the number of files increases, the time needed to download all of the files to restore or migrate a device also increases. This time needed to download all of the files can result in lost productivity when the user devices are being restored because users typically cannot use their devices during this restoration, thereby resulting in additional expenses if user productivity is interrupted or delayed. Consequently, as the number of user devices 122, 124, and 126 in local area network 120 increases, the number of files to be downloaded during a restoration increases, along with the cost and time needed to transmit all of these files across the internet/cloud 130 from a server 112 to each of the user devices 122, 124, and 126.

Although the present example describes one configuration of entities in wide area network 110 and local area network 120, it should be noted that many different entities and configurations of these entities can also be used. For instance, additional user devices may be included in local area network 120, such as when all of the user devices in a particular department or company are included in local area network 120. Furthermore, although server 112 is described above as storing the backup data for user devices 122, 124, and 126, other entities can also store the backup data instead of or in addition to server 112. Additionally, different entities than those shown can be included in wide area network 110 depending on the particular configuration of the local area network 120 and wide area network 110.

As described with regard to FIG. 1, methods typically used to backup and restore multiple user devices in a local area network can be very expensive and time-consuming. Accordingly, various embodiments of the present invention as described below provide alternative methods of backing up and restoring multiple user devices in a local area network more efficiently. These efficiencies aim to reduce the costs and time associated with restoring or migrating data for these multiple devices.

Figure 2:
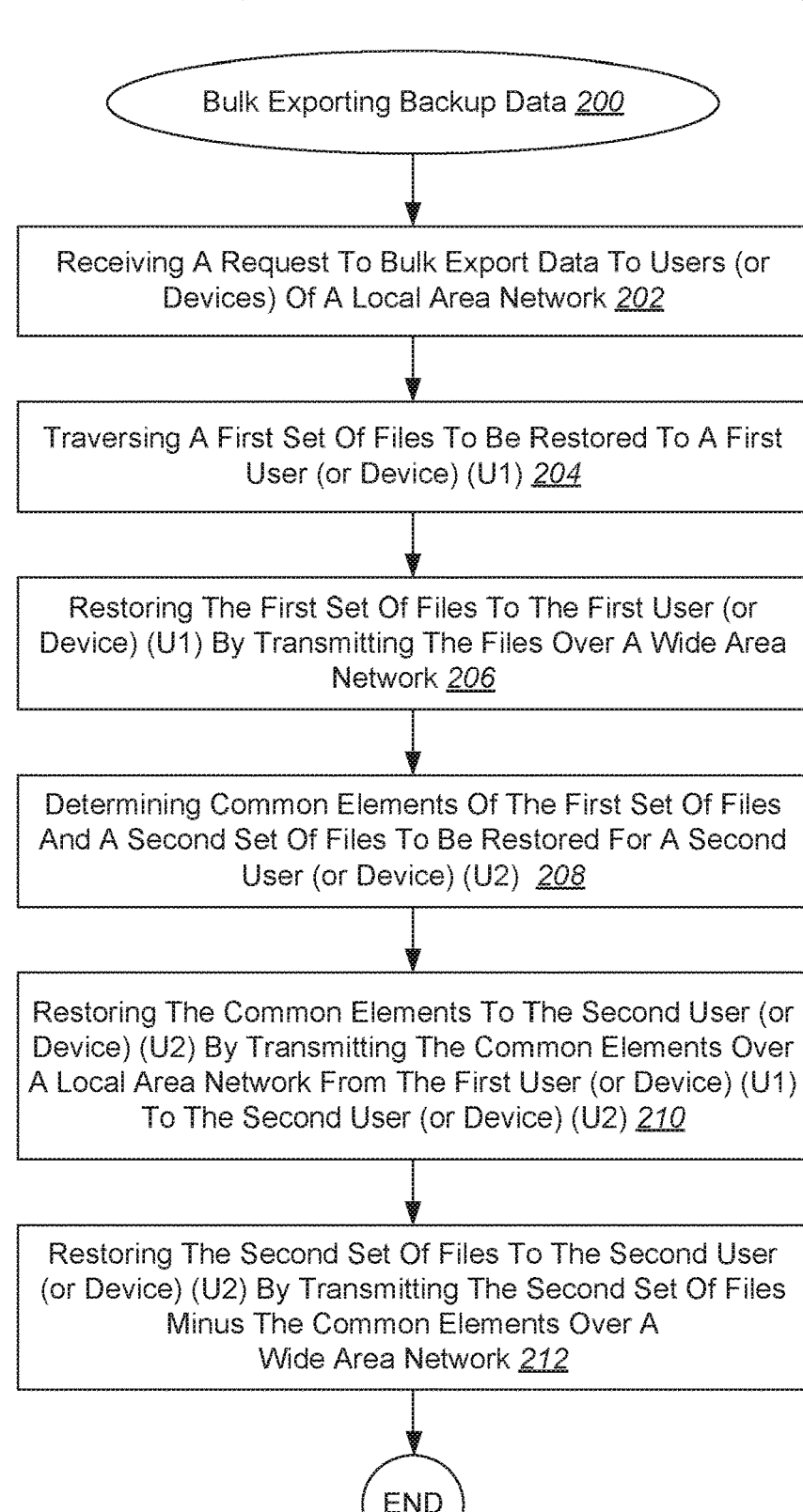
FIG. 2 is a diagrammatic representation showing one example of a process for more efficiently bulk exporting backup data.

With reference to FIG. 2, shown is a diagrammatic representation of one example of a process for more efficiently bulk exporting backup data. In this example, the process of bulk exporting backup data 200 begins at 202 when a server receives a request to bulk export data to user devices (which may also be referred to as devices, users, etc. herein). With reference to the configuration previously described in FIG. 1, the server can be part of a wide area network 110, such as servers 112 and 114. For the purposes of the current example, the process begins when server 112 has been requested to bulk export data to a first user device (U1) and second user device (U2), where server 112 is located in wide area network 110 and communicates with the first user device (U1) and second user device (U2) through an internet connection 130. In this example, the first user device (U1) and second user device (U2) are part of the same local area network 120. It should be noted that although only two user devices are described in this example, this process can be extended to any number of user devices.

In the present embodiment, once server 112 receives a request to bulk export backup data to the first user device (U1) and second user device (U2), then at 204, server 112 traverses the data to be restored for the first user device (U1). Next, at 206, the server restores this data to the first user device (U1) by transmitting the data over a wide area network. Specifically, the data is transmitted from the server to the first user device (U1) over an internet connection.

Once the data is transmitted and restored to user device (U1), then at 208, the server determines whether common elements exist between the data transmitted to the first user device (U1) and the data to be restored to the second user device (U2). According to various embodiments, the common elements may include data such as files and/or blocks, depending on the particular implementation of the process. For instance, the common elements may include one or more identical files to be restored to both the first user and the second user. In one implementation, identical files can be determined to be identical based on identical checksums. According to various embodiments, a hash may be referred to herein as a checksum. It should be noted that because the files can include one or more blocks, these one or more blocks would also be identical if it is determined that the files are identical.

In some embodiments, the common elements may include identical blocks to be restored to both the first user and the second user. For instance, this situation can occur when one or more blocks are identical within a file, even if other blocks within the file are not identical. In one implementation, identical blocks can be determined to be identical based on one or more blockmaps that are included in a corresponding file. Specifically, in the current example, one of the first set of files can include a first blockmap. This first blockmap can include one or more object identifiers corresponding to a set of offsets. Additionally, the first blockmap can also include attributes such as file shareinfo, which indicates whether a first block is shared with other user devices. For instance, the file shareinfo may indicate that the first object is shared with the first user, the second user, and a third user.

Next, at 210, if common elements are detected, then the common elements are transmitted from the first user device (U1) to the second user device (U2) over a local area network. Accordingly, if common elements are present between the first user device (U1) and second user device (U2), then these common elements will be restored within the local area network without an additional transmission of the corresponding data from the server to the second user device (U2) across the internet.

According to various embodiments, once the data associated with the common elements is restored to second user device (U2) from first user device (U1), then at 212, the server 112 then restores the data to the second user device (U2) that has not already been transmitted and restored by the first user device (U1). In other words, the server 112 transmits the data needed to restore the second user device (U2) minus the common elements over a wide area network to the second user device (U2). Accordingly, if the data needed to restore second user device (U2) includes a total of five files, and two of these files are common elements between first user device (U1) and second user device (U2), then the three remaining files will be transmitted from server 112 to second user device (U2) from the server's location in the wide area network across an internet connection.

The process described in this example and the following examples below address various use cases relating to bulk exporting of backup data. In particular, one use case includes retrieving a single copy of a shared file and copying that to all the user devices. Another use case includes retrieving all of the metadata of the files to be restored, and restoring the files for all of the user devices in one step. Another case includes retrieving a single copy of a file that has appears multiple times across user devices, and then copying the file to all of the user devices. In yet another case, data (such as blocks or files) having the same checksum can be copied to all user devices in one step. In particular, one or more identical data chunks having the same checksum can be copied from an initial user device that downloaded the data from the server to the other user devices that also include these identical data chunks.

The example described with regard to FIG. 2, as well as other examples described in this specification, provides numerous advantages for bulk exporting backup data over previously implemented systems and processes. One advantage is that numerous embodiments described herein facilitate faster restoration of user devices because less data will typically be transmitted from a backup server to the user devices over an internet connection. Because unique backup data is only transmitted once from the wide area network across the internet and this backup data is then copied to other user devices within a local area network, there will be less time needed to export and download the data across the internet. From the server side, the cost of goods sold (COGS) is reduced because less total data needs to be sent in order to restore multiple user devices having at least some identical data. Specifically, because less total data must be transmitted to restore the user devices, the server can use less time and resources to export the data. Additionally, from the perspective of the local area network that includes user devices receiving the backup data, the amount of bandwidth needed to download the backup data is reduced. These advantages can be realized for many use cases such as download, restore, data access, fetch, etc. Furthermore, various embodiments described herein can be useful for many types of workloads, such as servers, virtual machines (VMs), databases, endpoints, cloud applications, cloud resources like EC2, RDS, etc. Accordingly, various systems that involve backing up datasets can be more efficiently implemented and/or optimized using one or more of the embodiments described herein, depending on the configuration and needs of the particular system.

Figure 3:
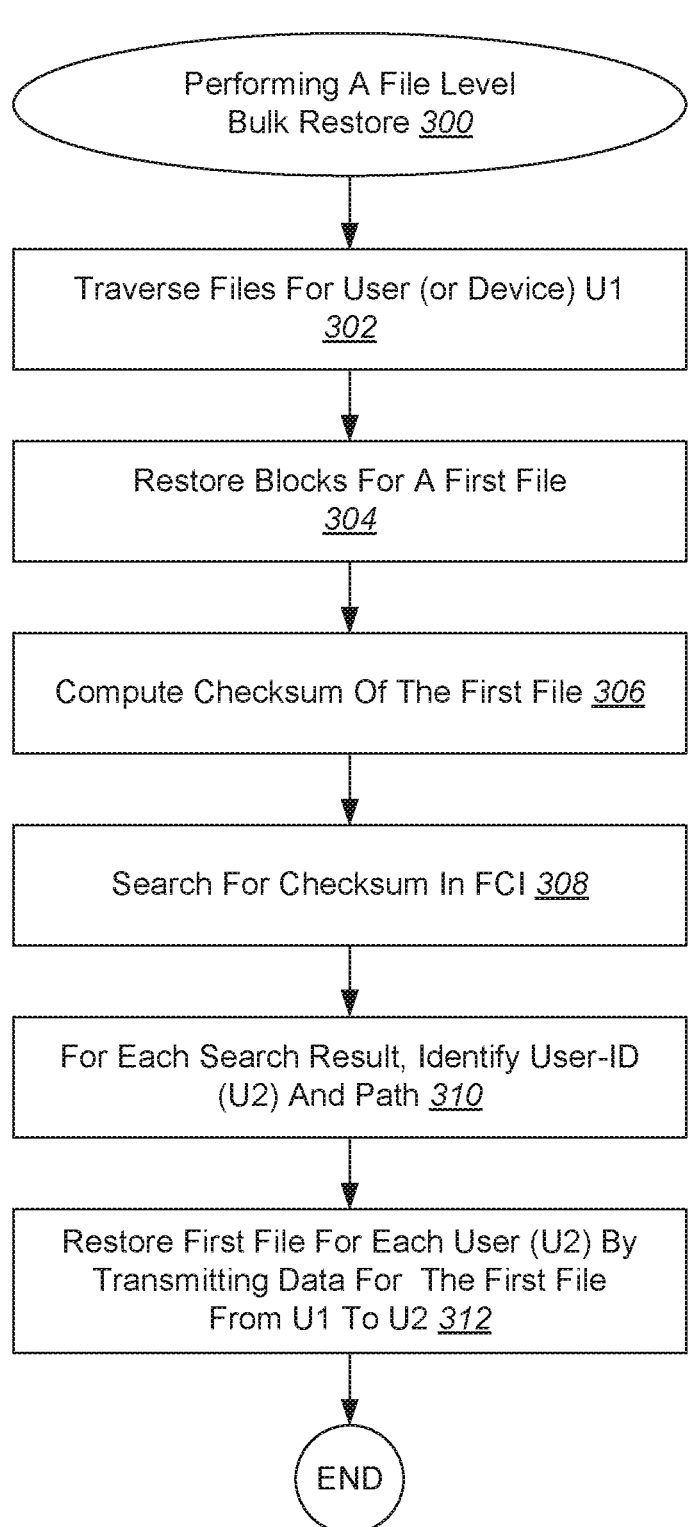
FIG. 3 is a diagrammatic representation showing one example of a process for performing a file level bulk restore.
Figure 4:
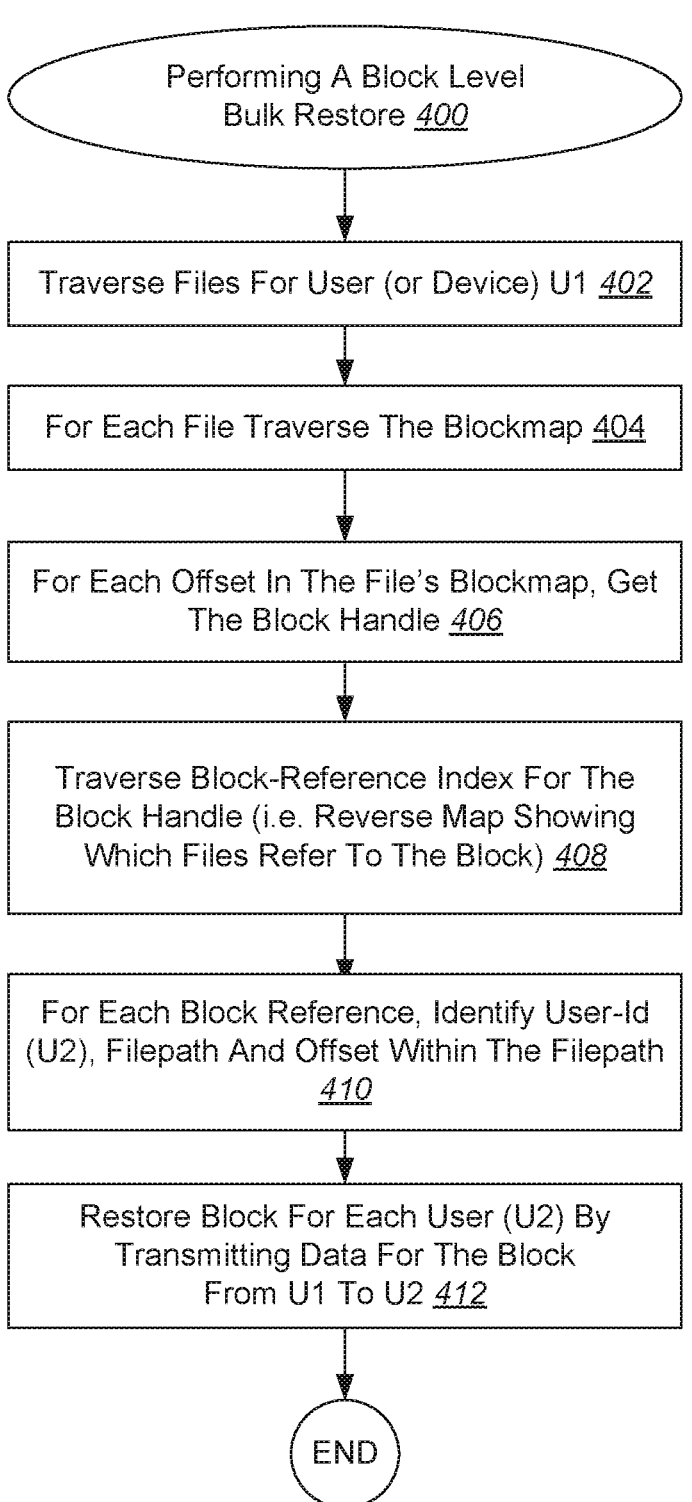
FIG. 4 is a diagrammatic representation showing one example of a process for performing a block level bulk restore.

As described above with regard to FIG. 2, backup data can be bulk exported at either the file level or the block level. As such, FIG. 3 shows a particular example of a file level bulk restore and FIG. 4 shows a particular example of a block level bulk restore. As with FIG. 2, the processes described in conjunction with FIGS. 3 and 4 each includes identifying whether any common elements exist between the user devices to be restored in a particular local area network. Specifically, the process described with FIG. 3 includes using a file checksum index (FCI) to find common elements, and the process described with FIG. 4 includes using a block reference index to find common elements.

With reference to FIG. 3, shown is a diagrammatic representation showing one example of a process for performing a file level bulk restore. In this example, the process 300 begins at 302 when a server traverses files for user device U1 to determine what files need to be restored. Next, at 304, blocks are restored at user device U1 for a first file. Although the first file may include multiple blocks, it may also include a single block in some instances. Once the block(s) are restored for the first file, then at 306, a checksum is computed for the first file.

In the present example, once the checksum is computed for the first file, then at 308, an FCI is searched for the checksum computed at 306. According to various embodiments, the FCI includes the checksums for files and/or blocks that have been backed up for the user devices. If two files or blocks have the same checksum, it is assumed that the file and/or block are the same. Accordingly, any and all files and/or blocks with the same checksum calculated to 306 are considered to be identical to the first file. It should be noted that although the present example includes using the FCI to restore data at the file level, it can also include using the FCI to restore data at the block level in some implementations.

Once search results are found for files and/or blocks that match the calculated checksum, then for each search result, a User-ID (U2) and path are identified at 310. The User-ID (U2) indicates which user device in the local network has a file and/or block that matches the checksum of the first file, and the path indicates where this matching file and/or block is located. In some instances, the first file may occur one or more times for user device U2.

Next, at 312, the first file is restored for each user device U2 found in the search results by transmitting data for the first file from user device U1 to user device U2. In some embodiments, if user device U2 includes multiple locations where the first file appears, then U1 may transmit data for the first file to U2 for each location. In other embodiments, U1 may transmit data for the first file to U2 once to a first location, and then the first file can be copied, referenced, or the like, for the additional locations at U2.

In the present example, the first file is restored for each user device U1 and U2 by transmitting the first file once over an internet connection to user device U1, and then transmitting the first file over a local area network from user device U1 to each user device U2. When the server subsequently performs a file level bulk restore for user device U2, then the files that have already been restored from U1 over the local area network will be skipped because they will already be present for user device U2. Accordingly, when the files are traversed for user device U2 to determine what files need to be restored, the first file can be removed from the files that need to be restored and transmitted across an internet connection by the server. Only the remaining files, which have not previously been restored by user device U1 to user device U2 over a local area connection, are then transmitted over an internet connection to user device U2.

Because transmitting data over a local area network is typically much faster and less expensive than transmitting data over an wide area network, cloud, and/or internet connection, the process 300 provides a much lower cost alternative to those previously implemented when bulk restoring multiple user devices. Specifically, by reducing the number of files and/or blocks that are transmitted over an internet connection from the server to the user devices in a local area network, the cost and time to restore the files to multiple users in a bulk restore is reduced significantly. Because cost and time savings increases for every redundant file and/or block found between the multiple users, the savings can become even more significant as the number of user devices increases.

Although the present example relates to restoring data at the file level, it should be noted that this example can also be applied at the block level in some implementations. Additionally, other implementations of file level and block level restores can also be provided within the scope of this disclosure that reduce the amount of data transmitted across a wide area network and internet connection. For instance, FIG. 4 is a diagrammatic representation of one example of a process for performing a block level bulk restore that reduces the amount of data transmitted across a wide area network and internet connection from a backup server to user devices connected to each other via a local area network.

With reference to FIG. 4, shown is a diagrammatic representation of one example of a process for performing a block level bulk restore. In this example, the process 400 includes using a deduplication (dedup) index to identify identical blocks that can be restored locally after download-ing the blocks to a first user device.

In the present example, the process 400 begins at 402 when a server traverses files for user device U1 to determine what files need to be restored at user device U1. Next, the blockmap for each file is traversed at 404.

At 406, the block handle for each offset in the file's blockmap is obtained. Using these block handles including a first block handle, the server traverses a block-reference index at 408 to find files that refer to the block handles at 408. According to various embodiments, the block-reference index is a reverse map that shows which files refer to other files.

Next, at 410, for each block reference found, identify the user-ID, filepath, and offset within the filepath. According to various embodiments, a block reference includes a file pointing to the block (for example through an inode num-ber), and an offset in the file that points to the block. In particular embodiments, the User-ID (U2), filepath, and offset within the file are identified for each block reference at 410.

According to various embodiments, at 412, the server then restores the block for each user device U2 that refer-ences the block by transmitting data for the first block from user device U1 to user device U2. In some embodiments, if user device U2 includes multiple locations where the block appears, then U1 may transmit data for the block to U2 for each location. In other embodiments, U1 may transmit data for the block to U2 once to a location, and then the file can be copied, referenced, or the like, for the additional locations at U2.

In the present example, the block is restored for each user device U1 and U2 by transmitting the block once over an internet connection from the server to user device U1, and then transmitting the block from user device U1 to each user device U2 over a local area network. When the server subsequently performs a block level bulk restore for user device U2, then the blocks that have already been restored from U1 over the local area network will be skipped for U2 because they will already be present. Accordingly, when the blocks are traversed for user device U2 to determine what blocks need to be restored, the first block can be removed from the blocks that need to be restored and transmitted across an internet connection from the server. Only the remaining blocks, which have not previously been restored by user device U1 to user device U2 over a local area connection, are then transmitted over an internet connection to user device U2.

As described previously with regard to FIG. 3, transmit-ting data over a local area network is typically much faster and less expensive than transmitting data over a wide area network, cloud, and/or internet connection. Because process 400 reduces the number of blocks (and/or files) that are transmitted over an internet connection from the server to the user devices in a local area network, the cost and time needed to restore the data to multiple users in a bulk restore is reduced significantly as compared to previous methods. In addition, performing a block level bulk restore addresses the use case in which multiple users have stored files with small variations between them. Specifically, if these files are not identical to each other, they may not be restored locally during a file level restoration. However, if the files are largely identical but have a certain number of blocks that are different between them, then just these non-identical blocks can be restored from the server and the identical blocks can be restored locally. For a file that is stored by multiple users and only has different data for one block, most of the data for the file can be restored locally, thereby reducing the amount of data that is transmitted across costly internet and/or wide area network connections.

In the present example, the overall process 400 involves restoring blocks for a user device U1 and then finding other user devices U2 that also refer to the blocks. However, this process can also be extended to other configurations. According to various embodiments, the overall process 400 proceeds one block at a time starting with a first block. In another embodiment, the process 400 can be extended to partially matching blocks. For instance, multiple blocks can be restored at U2 by U1 if these multiple blocks have matching checksums. Accordingly, by restoring U2 at the block level, it is possible to restore files partially to U2 within the local area network. The remaining blocks in these files that have not been restored to U2 from U1 can then be restored during U2's restore. In this implementation, the server would traverse the blocks within the files to be restored to U2 to determine which blocks still need to be transmitted over the more expensive and time-consuming wide area network internet/cloud connection to restore U2.

As previously discussed, reducing the amount of data transmitted from the server to user devices during a data restoration also reduces the cost and time needed to imple-ment the data restoration. By restoring U2 locally at the block level and not just the file level, the amount of data transmitted from the server to user devices is further reduced. Depending on the particular system to be restored, block level and/or file level bulk restores performed using the processes described in this disclosure can result in significant cost and time savings.

Figure 5A:
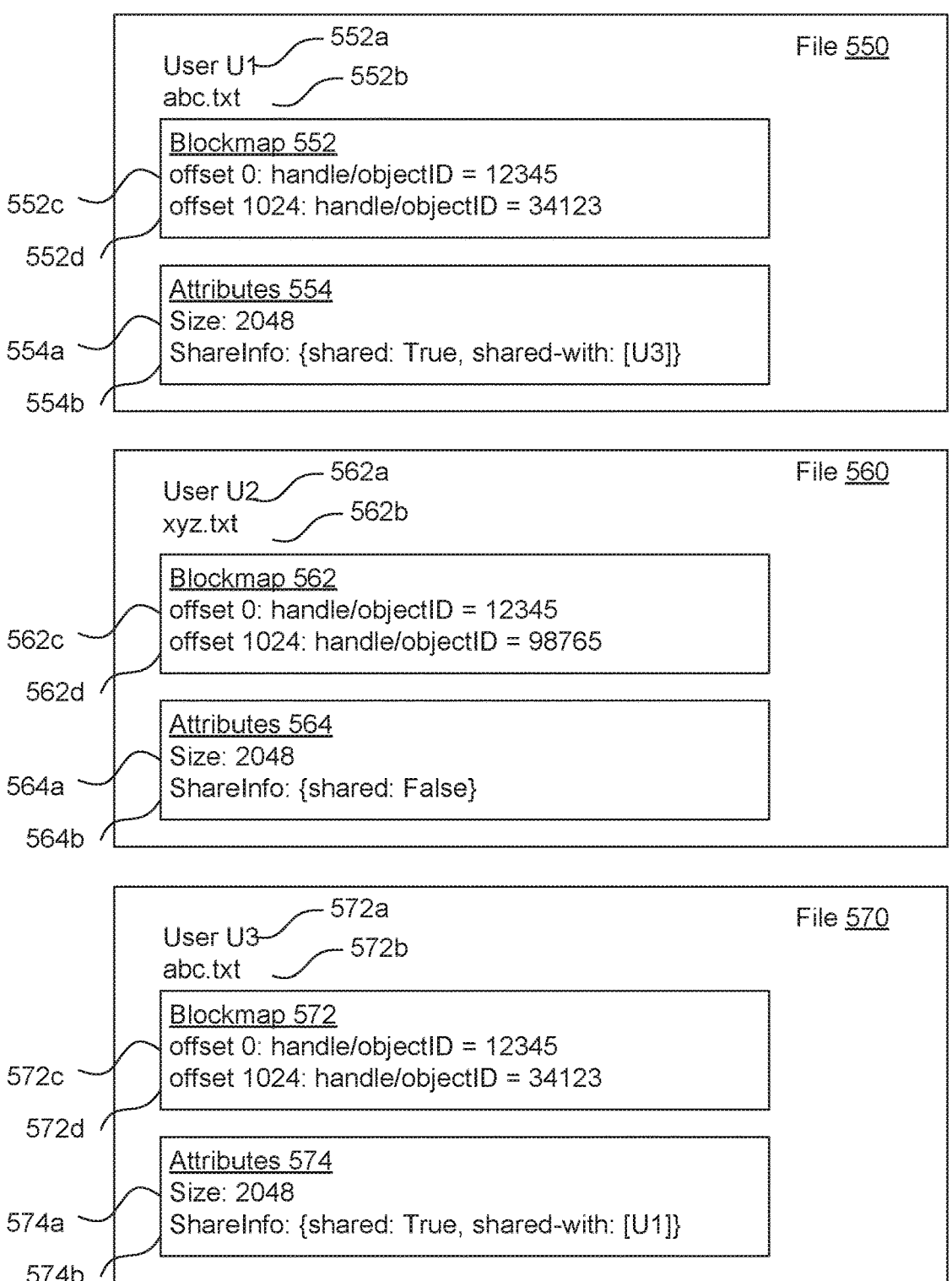
FIG. 5A is a diagrammatic representation showing an example of a set of file-blockmaps.

FIG. 5A is a diagrammatic representation of a file block-map and block reference information that can be used to enhance bulk export of backup data.

In this example, files 550, 560, and 570 are associated with users 552a, 562a, and 572a and filenames 552b, 562b, and 572b respectively. File 550 is owned by user U1 552a with a filename abc.txt at 552b. File 550 includes blockmap 552, with offset 0 at 552c having a handle/objectID of 12345 and offset 1024 at 552d having a handle/objectID of 34123.

File 550 has attributes 554 with a size of 2048 at 554*a* and shareinfo at 554*b* indicating that the file owned by U1 is shared with U3.

File 560 is owned by user U2 at 562*a* with a filename of xyz.txt at 562*b*. File 560 includes blockmap 562, with offset 0 at 562*c* having a handle/objectID of 12345 and offset 1024 at 562*d* having a handle/objectID of 98765. It should be noted that handle/objectID can be used interchangeably. File 560 has attributes 564 with a size of 2048 at 564*a* and shareinfo at 564*b* indicating that the file owned by U2 is not shared. File 570 is owned by user U3 at 572*a* with a filename of abc.txt at 572*b*. File 570 includes blockmap 572, with offset 0 at 572*c* having a handle/objectID of 12345 and offset 1024 at 572*d* having a handle/objectID of 34123. File 570 has attributes 574 with a size of 2048 at 574*a* and shareinfo at 574*b* indicating that the filed owned by U3 is shared with U1.

According to various embodiments, a blockmap is provided for each file. Furthermore, depending on the implementation, a blockmap can include information such as offsets and handles. Attributes can also be included with each file where the attributes indicate the size along with share information. Additional or different information can also be included depending on the particular implementation.

In particular embodiments, files are traversed for a user U1. The block map for each file is traversed to access the block handles associated with each offset. Using these block handles, the server can traverse a block-reference index to find files that refer to associated blocks. For each block reference, a user-ID, filepath, and offset within the filepath can be identified. The server can then restore the blocks for users by transmitting an identical block between users or from disk arrays to users that may be connected over more local area networks. As mentioned previously, in some embodiments, if user device U2 includes multiple locations where any block of the file such as the first block appears, then U1 may transmit data for the first block to U2 for each location. In other embodiments, U1 may transmit data for the first block to U2 once to a first location, and then the first file can be copied, referenced, or the like, for the additional locations at U2. Similarly, if U3 has multiple locations where the first block appears, data can be transmitted from U1 to U3 for each location in some implementations, and can be transmitted once to U3 and copied, referenced, etc. at U3 in other implementations. In the present example, the blocks are labeled as offsets but it should be recognized that alternative or additional names can be used. It should be noted that various embodiments of the present invention can be used on a block level, on a file level, or on other particular levels of data organization. For example, U1 and U3 are associated with the same file. Restoration of a single copy of the file from the server to can be sufficient as U1 and U3 can access the file from U1 or a storage array on a local area network. In particular embodiments, U1 and U2 share handle 12345 and a single copy of the data associated with handle 12345 can be restored to U1 and U2.

Figure 5B:
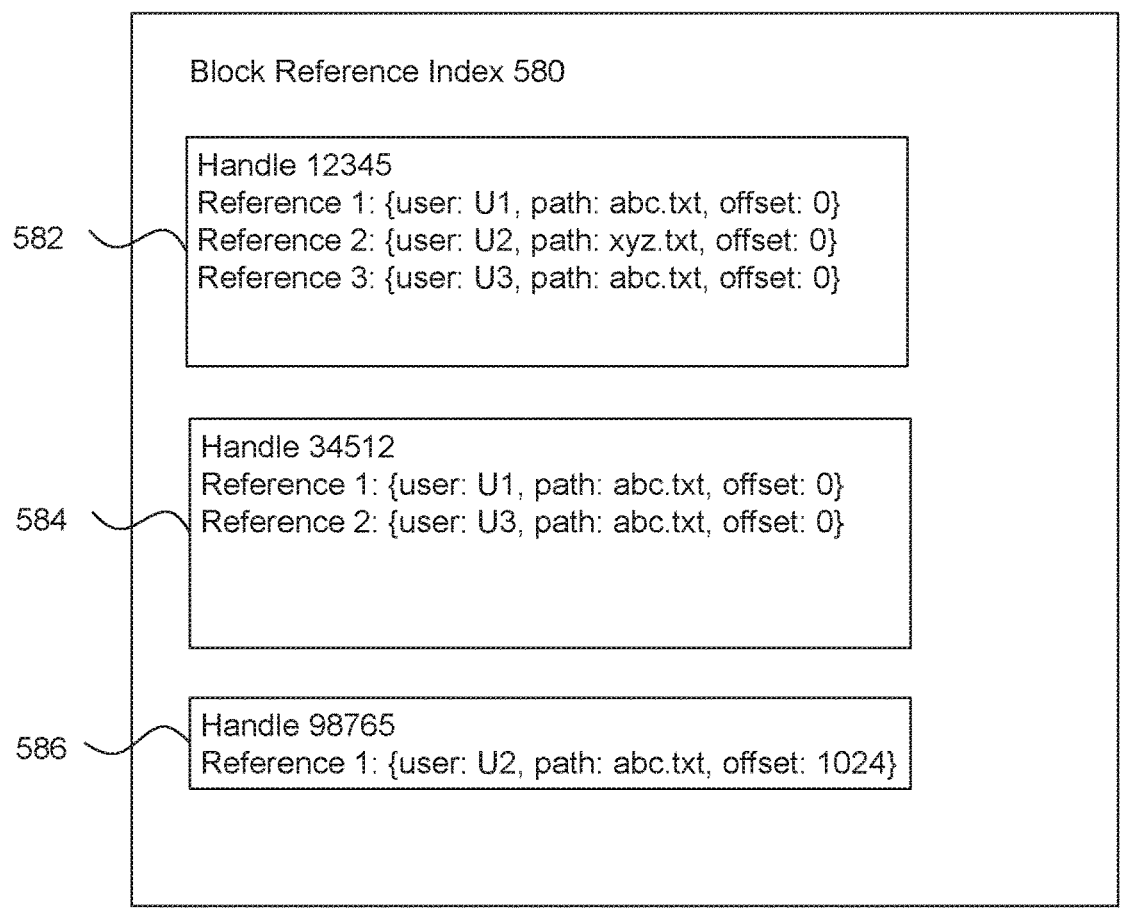
FIG. 5B is a diagrammatic representation showing an example of a block reference index.

FIG. 5B. is a diagrammatic representation showing one example of a block reference index 580. According to various embodiments, a block reference index 580 is a reverse map showing which files refer to a particular block. In particular embodiments, the block reference index 580 is traversed for a particular block handle to determine a user identifier, a filepath, and an offset within the filepath.

According to various embodiments, Block reference index 580 includes Handle 12345 at 582, Handle 34512 at 584, and Handle 98765 at 584. Handle 12345 includes Reference 1, indicating that user U1 is associated with path abc.txt at offset 0. Handle 12345 also includes Reference 2, indicating that user U2 is associated with path xyz.txt at offset 0. Handle 12345 also includes Reference 3, indicating that user U3 is associated with path abc.txt at offset 0. Handle 34512 at 584 includes Reference 1, indicating that user U1 is associated with path abc.txt at offset 0 and Reference 2, indicating that user U3 is associated with path abc.txt at offset 0. Handle 98765 at 586 includes Reference 1 indicating that user U3 is associated with path abc.txt at offset 1024.

Figure 6:
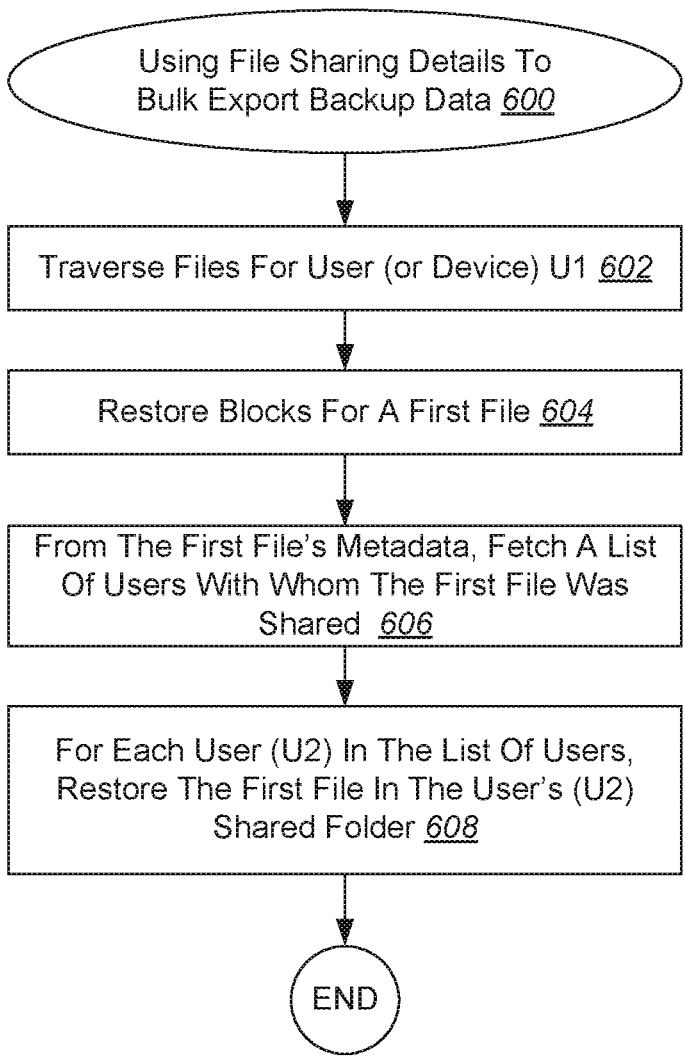
FIG. 6 is a diagrammatic representation showing an example of a process for using file sharing details to more efficiently bulk export backup data.

The previously described examples include processes that allow bulk restoration of file-level and block-level data in a more efficient manner by reducing the amount of redundant data transmitted from the server to users of a local area network over an internet connection. Other processes can also be used to more efficiently provide bulk export of backup data. In particular, with reference to FIG. 6, shown is a diagrammatic representation of one example of a process for using file sharing details to more efficiently bulk export backup data. This process is particularly useful for configurations such as OneDrive, Dropbox, etc. situations, in which multiple users share access to the same file through read-only access. In particular, this process uses file sharing details to more efficiently provide backup data to multiple users.

In the present example, a process 600 for using file sharing details to bulk export backup data begins at 602 when a server traverses files for a user device U1. According to various embodiments, the server determines which files and/or blocks need to be restored. Next, at 604, the server restores blocks for a first file. In particular embodiments, the server restores the blocks by transmitting the data across a wide area network via an internet connection to user device U1.

Next, in the present example, at 606, a list of users with whom the first file was shared is fetched from the first file's metadata. For each user U2 in the list of users obtained from the first file's metadata, then at 608, the first file is restored in the user U2's shared folder. According to various embodiments, the first file is restored at each user U2 in the list by transmitting data for the first file from user device U1 to user device U2 over a local area network. The first file is then restored in user U2's shared folder.

According to various embodiments, when the server restores the backup data for user U2, then the server can skip the files that have already been restored by another user U1 over the local area network. For each file skipped, the restoration process is made more efficient by reducing the amount of data that needs to be transmitted from the server to user U2 over an internet connection. As discussed previously, transmitting data over the internet is generally more expensive and time consuming than transmitting data over a local area network, so each file that can be skipped in the restoration from the server to user U2 results in savings of time and expense.

Figure 7:
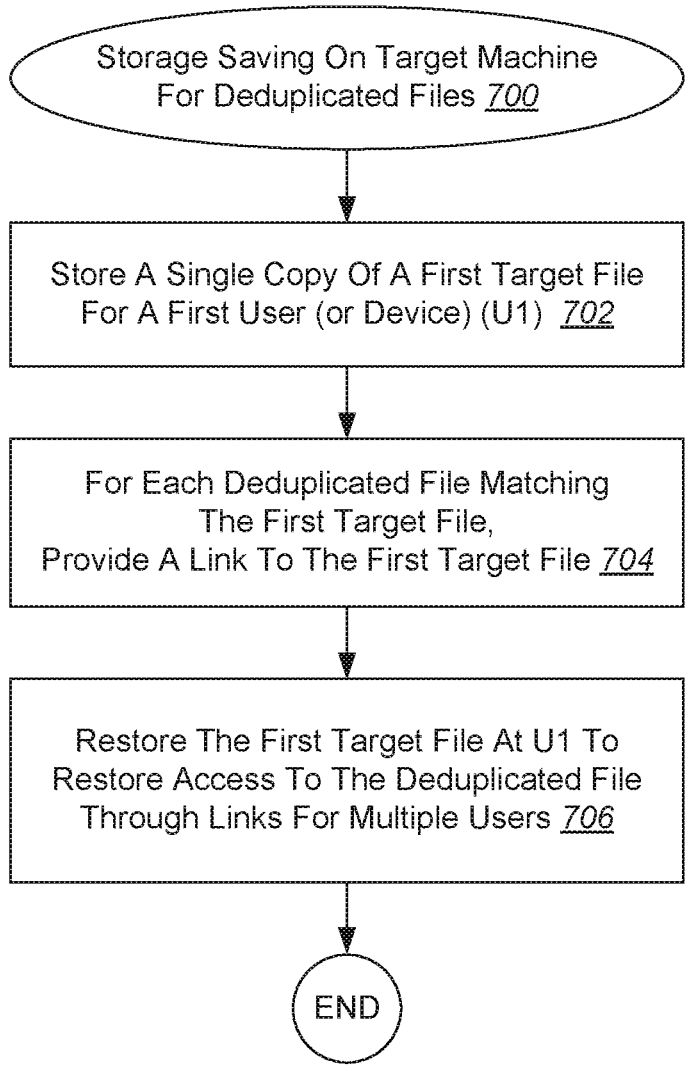
FIG. 7 is a diagrammatic representation showing an example of a process for saving storage on a target machine for deduplicated files.

As mentioned previously, additional processes can also be used to more efficiently provide bulk export of backup data. In particular, with reference to FIG. 7, shown is a diagrammatic representation of one example of a process for saving storage on a target machine for deduplicated files. According to various embodiments, deduplication is the process of storing duplicated files as a single file when archived for backup purposes. This process is useful for saving storage on devices connected in a local area network by storing only one copy of the deduplicated file at a first user device U1 and providing other user devices U2 with a link to the deduplicated file. Of course, this process only saves storage when there are duplicate copies of files stored within the local area network.

In the present example, the process 700 for storage saving on a target machine for deduplicated files begins at 702 when a single copy of a first target file is stored for a first user device U1. According to various embodiments, the first target file is stored at user device U1 and a backup copy is stored at a server located somewhere in a wide area network that communicates with user device U1 through an internet connection. In some embodiments, a server transmits data for the first target file across a wide area network via an internet connection to user device U1. User device U1 then stores the first target file. This target file is stored as a single copy that is accessible to other user devices U2 within the local area network via a link.

The present example continues at 704 by providing each deduplicated file matching the first target file with a link to the first target file. Accordingly, when a user device U2 wants to access to the first target file, user device U2 follows a hard link to the first target file, which is stored at user device U1 or other local area network storage. According to various embodiments, a deduplicated file can be stored in shared storage such as network attached storage (NAS) or another storage array. In some examples, user device U2 can then view and/or download a copy of the first target file. Furthermore, in some cases, this copy of the first target file can be a read-only file that allows viewing and download. In some implementations, once downloaded, the first target file can be saved as a new copy or version and this new copy or version can be modified or edited after it is stored locally at a user device U2.

In the present example, if the first target file needs to be restored, then it only needs to be restored at one location. According to various embodiments, the process continues at 706 by restoring the first target file at user device U1 to restore access to the first target file through links for multiple users in a local area network. In particular, because only one copy of the first target file is stored at user device U1 and other user devices U2 can access the first target file through a hard link, then by updating and/or restoring this single copy of the first target file at user device U1, the other user devices U2 will have access to this updated and/or restored copy of the first target file once it is received from a server and stored at user device U1.

This process results in both storage savings and cost/time savings to restore the first target file across all users U1 and U2 of the first target file. Because the first target file is only saved once at user device U1, space can be saved at each user device U2 where there would otherwise be a duplicate copy of this target file stored. Additionally, during a restoration, because the data for the first target file only needs to be transmitted from the server once across a wide area network internet connection to user device U1 to restore the first target file for all of the user devices U2, then the amount of time and expense needed to update the multiple users is reduced greatly. Accordingly, by storing snapshots of a single user device U1, a server can provide access to restored data for the target file to multiple users U2 much more quickly and inexpensively than restoring each individual user device U2 with the data for the target file directly from the server over an internet connection.

The present disclosure provides various examples of processes for more efficiently bulk exporting backup data to multiple users of a local area network. These processes, including variations and extensions of them, can be useful in many systems having different configurations and characteristics. Accordingly, the particular process for more efficiently bulk exporting backup data may be chosen based on the needs of the particular system. For instance, if space savings in the local area network is crucial, then a process such as that described in conjunction with FIG. 7 may be suitable because this process saves storage space by providing links to a target file for deduplicated files. Because only a single copy of the target file is stored at a local area network and other users follow a link to access the target file, restoring this target file for all users involves restoring only the single copy of the target file that is referenced by the other users. However, in other examples, a different process may be selected to efficiently bulk export backup data to multiple users of a local area network. For instance, if particular blocks often appear for different users in different files, a block level bulk restore, such as the one described in conjunction with FIG. 4, may be desirable to more effectively address the needs of that system. Accordingly, the process chosen to bulk export backup data to multiple users in a local area network can be selected based on the needs of the user devices in that network.

Although particular examples of processes for bulk exporting backup data have been provided herein, this disclosure is not intended to be limiting, but merely provided to explain particular implementations of the present invention. Accordingly, it is intended that these example processes and systems, as well as equivalents, variations, and extensions to be included within the scope of this disclosure.

Figure 8:
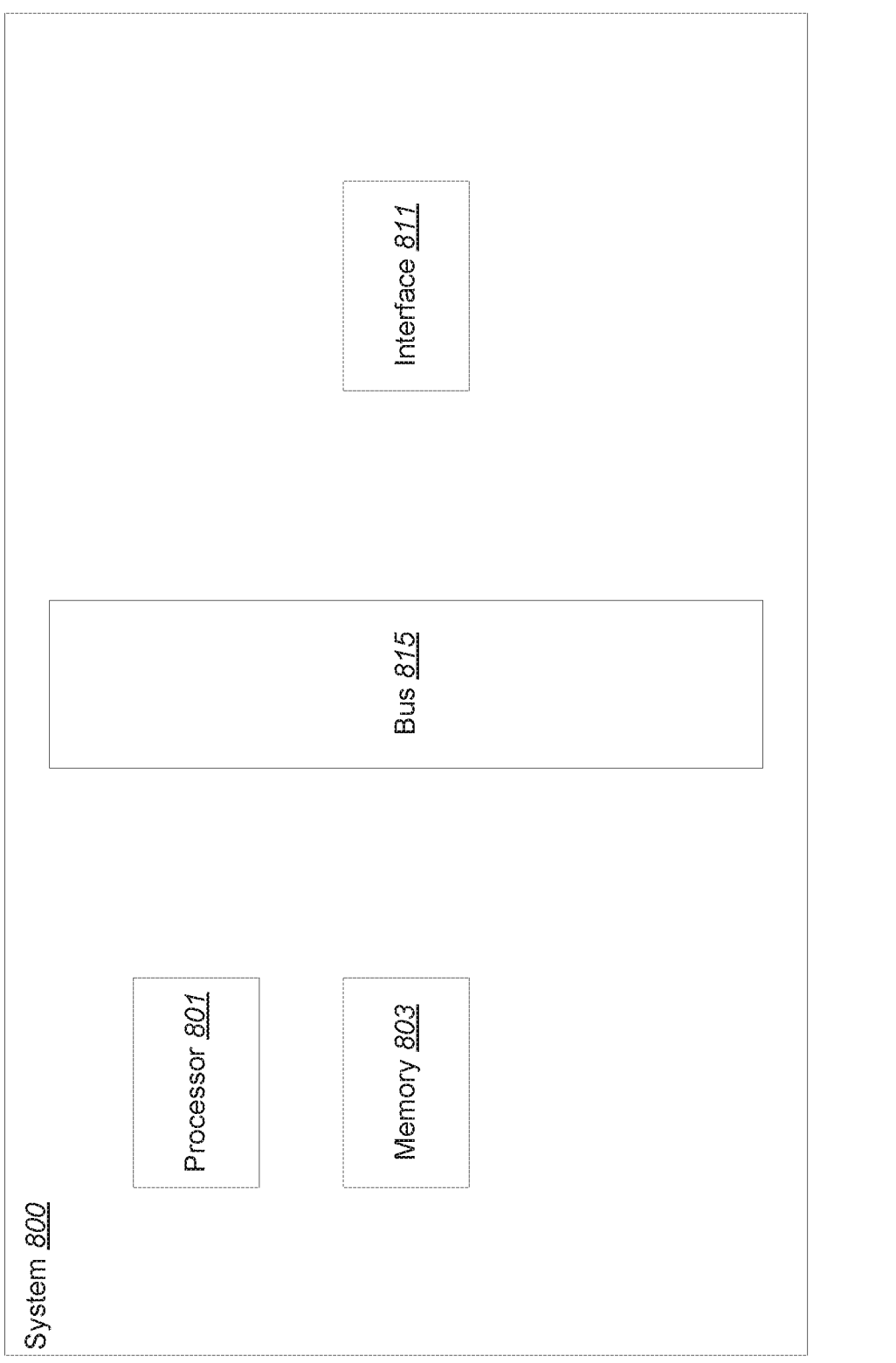
FIG. 8 is a diagrammatic representation of a computer system that can be used with various embodiments of the present invention.

The various systems and processes described in conjunction with various embodiments of the present invention, some examples of which are described above, can be implemented using one or more computers. With reference to FIG. 8, shown is a particular example of a computer system that can be used to implement particular examples of the present invention. For instance, the computer system 800 can be used to implement a computing device, such as a user device, server, storage array, cloud services provider, etc., according to various embodiments described above. According to particular example embodiments, a system 800 suitable for implementing particular embodiments of the present invention includes a processor 801, a memory 803, an interface 811, and a bus 815 (e.g., a PCI bus). The interface 811 may include separate input and output interfaces, or may be a unified interface supporting both operations. When acting under the control of appropriate software or firmware, the processor 801 is responsible for such tasks such as optimization. Various specially configured devices can also be used in place of a processor 801 or in addition to processor 801. The complete implementation can also be done in custom hardware. The interface 811 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 800 uses memory 803 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

CONCLUSION

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention. Moreover, although particular features have been described as part of each example, any combination of these features or additions of other features are intended to be included within the scope of this disclosure. Accordingly, the embodiments described herein are to be considered as illustrative and not restrictive.

What is claimed is:

1. A method, comprising:

receiving at a server a request to bulk export data to a plurality of users including a first user and a second user, the bulk export data comprising a plurality of files to be restored onto a first user device associated with the first user and a second user device associated with the second user, wherein the server is connected to the first and second user devices over a wide area network and the first and second user devices are connected to each other over a local area network;

traversing a first plurality of files to be restored for a first user;

restoring the first plurality of files to the first user by transmitting the first plurality of files over the wide area network;

identifying a first subset of files and a second subset of files in the first plurality of files, the first subset of files common to the first and the second user and a second subset of files not common to the first and the second user;

restoring the first subset of files at a file level to the second user by copying the first subset of files from the first user to the second user over a local area network;

restoring the second subset of files at a block level to the second user by determining common elements of the second subset of files to be restored for the second user, wherein common elements are determined by referencing a plurality of blockmaps associated with the first plurality of files and the second plurality of files, wherein common elements are further determined by traversing a reverse map that, for each block handle, identifies a user identifier, a filepath, and an offset within the filepath that references the block;

restoring the common elements of the second subset of files the second user by transmitting the common elements over a local area network from the first user device to the second user device; and restoring a second plurality of files to a second user by transmitting the second plurality of files minus the common elements over a wide area network to the second user.

2. The method of claim 1, wherein the common elements comprise a first plurality of identical files to be restored to both the first user and the second user.

3. The method of claim 2, wherein the first plurality of identical files are determined to be identical based on identical checksums.

4. The method of claim 2, wherein the first plurality of identical files are deduplicated files.

5. The method of claim 1, wherein the common elements comprise a first plurality of identical blocks to be restored to both the first user and the second user, wherein each of the first plurality of files includes a plurality of blocks.

6. The method of claim 5, wherein the first plurality of identical blocks are determined using a plurality of blockmaps, each of the first plurality of files including a corresponding blockmap.

7. The method of claim 5, wherein a first file in the first plurality of files comprises a first blockmap.

8. The method of claim 7, wherein the first blockmap comprises a plurality of objects identifiers corresponding to a plurality of offsets.

9. The method of claim 8, wherein the first blockmap further comprises attributes including shareinfo indicating whether a first block is shared with other user devices.

10. The method of claim 9, wherein the shareinfo indicates that the first object is shared with the first user, the second user, and a third user.

11. A non-transitory computer readable medium, comprising:

computer code for receiving at a server a request to bulk export data to a plurality of users including a first user and a second user, the bulk export data comprising a plurality of files to be restored onto a first user device associated with the first user and a second user device associated with the second user, wherein the server is connected to the first and second user devices over a wide area network and the first and second user devices are connected to each other over a local area network;

computer code for traversing a first plurality of files to be restored for a first user;

computer code for restoring the first plurality of files to the first user by transmitting the first plurality of files over the wide area network;

computer code for identifying a first subset of files and a second subset of files in the first plurality of files, the first subset of files common to the first and the second user and a second subset of files not common to the first and the second user;

computer code for restoring the first subset of files at a file level to the second user by copying the first subset of files from the first user to the second user over a local area network;

computer code for restoring the second subset of files at a block level to the second user by determining common elements of the second subset of files to be restored for the second user, wherein common elements are determined by referencing a plurality of blockmaps associated with the first plurality of files and the second plurality of files, wherein common elements are further determined by traversing a reverse map that, for each block handle, identifies a user identifier, a filepath, and an offset within the filepath that references the block;

computer code for restoring the common elements of the second subset of files to the second user by transmitting the common elements over a local area network from the first user device to the second user device; and computer code for restoring a second plurality of files to a second user by transmitting the second plurality of files minus the common elements over a wide area network to the second user.

12. The computer code of claim 11, wherein the common elements comprise a first plurality of identical files to be restored to both the first user and the second user.

13. The computer code of claim 12, wherein the first plurality of identical files are determined to be identical based on identical checksums.

14. The computer code of claim 12, wherein the first plurality of identical files are deduplicated files.

15. The computer code of claim 11, wherein the common elements comprise a first plurality of identical blocks to be restored to both the first user and the second user, wherein each of the first plurality of files includes a plurality of blocks.

16. The computer code of claim 15, wherein the first plurality of identical blocks are determined using a plurality of blockmaps, each of the first plurality of files including a corresponding blockmap.

17. The computer code of claim 15, wherein a first file in the first plurality of files comprises a first blockmap.

18. The computer code of claim 17, wherein the first blockmap comprises a plurality of objects identifiers corresponding to a plurality of offsets.

19. The computer code of claim 18, wherein the first blockmap further comprises attributes including shareinfo indicating whether a first block is shared with other user devices.

20. The computer code of claim 19, wherein the shareinfo indicates that the first object is shared with the first user, the second user, and a third user.

* * * * *